United States Patent
Thesen

(10) Patent No.: US 6,553,132 B1
(45) Date of Patent: Apr. 22, 2003

(54) METHOD FOR MOTION CORRECTION IN A SERIES OF IMAGES OF A RIGID BODY

(75) Inventor: Stefan Thesen, Meckenheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/470,475

(22) Filed: Dec. 22, 1999

(30) Foreign Application Priority Data

Dec. 23, 1998 (DE) ............................ 198 60 038

(51) Int. Cl.⁷ ................................. G06K 9/00
(52) U.S. Cl. ................. 382/107; 382/131; 382/277; 382/297; 348/699; 378/69
(58) Field of Search .............. 382/107, 131, 382/277, 293, 296, 297; 348/699; 378/39, 69

(56) References Cited

U.S. PATENT DOCUMENTS

| | | | | |
|---|---|---|---|---|
| 4,908,874 A | * | 3/1990 | Gabriel | 382/277 |
| 5,063,524 A | | 11/1991 | Ferre et al. | |
| 5,751,838 A | * | 5/1998 | Cox et al. | 382/107 |
| 5,946,417 A | * | 8/1999 | Bonneau et al. | 382/236 |
| 5,970,173 A | * | 10/1999 | Lee et al. | 382/236 |
| 6,055,326 A | * | 4/2000 | Chang et al. | 382/132 |
| 6,335,977 B1 | * | 1/2002 | Kage | 382/107 |
| 6,360,003 B1 | * | 3/2002 | Doi et al. | 382/107 |
| 6,430,304 B2 | * | 8/2002 | Hanna et al. | 382/107 |

FOREIGN PATENT DOCUMENTS

| | | |
|---|---|---|
| DE | 195 00 338 | 2/1996 |
| GB | 2 187 059 | 8/1987 |

OTHER PUBLICATIONS

Digitale Bildcodierung, Ohm (1995), pp. 32–34 and 42–50.

* cited by examiner

Primary Examiner—Samir Ahmed
Assistant Examiner—Anand Bhatnagar
(74) Attorney, Agent, or Firm—Schiff Hardin & Waite

(57) ABSTRACT

The invention is directed to a method for motion correction given series of two-dimensional images of a rigid body, whereby the rigid body does not lie completely in the coverage area of the images and is cut off at one image edge or, respectively, at two image edges that do not lie opposite one another. Given two time-successive images, the mirror image or, respectively, the mirror images of the other are respectively attached to the one. A simple motion correction method is then implemented between the two newly arisen images that now show an approximately rigid body that lies completely within the coverage area of these newly arisen images.

16 Claims, 2 Drawing Sheets

METHOD FOR MOTION CORRECTION IN A SERIES OF IMAGES OF A RIGID BODY

BACKGROUND OF THE INVENTION

1. Field of the Invention

The present invention is directed to a method for motion correction given series of two-dimensional images of a rigid body, wherein the rigid body does not lie entirely in the coverage area of the images and is cut off at an image edge, or at two image edges that do not lie opposite one another.

2. Description of the Prior Art

A number of methods of motion correction for series of time-successive images (scenes) are known from the literature. Such scenes can, for example, be acquired by imaging systems of medical diagnostics such as computed tomography or magnetic resonance tomography, and include movements of an examination subject, for example a patient, during the registration of the scene, which can cause disturbances in the image that are intended to be eliminated by these motion correction methods.

Iterative methods are frequently employed for this purpose, in which all parameters of the motion are simultaneously involved, but these require a high computational outlay.

A Fourier transformation of the image data with a following phase correlation is often applied as an auxiliary technique for the motion determination and correction. For example, European Application 0 368 746 and British Specification 2 187 059 disclose such techniques. German PS 195 00 338 discloses a method for determining the transformation parameters for automatic image registration, wherein the translation vector and rotational angle are determined by one-dimensional correlation of radial projections of selected search image areas from a current image and from a reference image.

The publication of Ohm, J.-R., Digita'e Bildcodierung, Springer-Verlag, 1995, pages 32–34, 42–50, is concerned with the problem of "edge continuation of image signals", which arises when a filter mask is used that does not coincide with the image coverage area, and thus values exist that lie outside the image coverage region. Various methods are proposed for definition of the signal values at these positions, namely periodic continuation, symmetrical continuation and value-constant continuation.

A further approach is the k-space method for motion correction. This shall be explained in greater detail for the two-dimensional case of a rigid body that lies in the xy-plane. Each movement is then unambiguously identified by the parameters representing translation in the x-direction, translation in the y-direction and rotation around the z-axis. By contrast to the iterative methods, the k-space method decouples the individual parameters from one another. This has the advantage that the sought parameters can be identified more simply by splitting the identification into discrete problems.

Since the Fourier transformation with its properties is the basis of this motion correction method, the relevant definitions and properties of Fourier transformation are first discussed herein, as follows.

Fourier transformation is a linear, mapping rom one mathematical domain to another that is defined as follows in the continuous, two-dimensional case:

$$\tilde{f}(\vec{k}) = \int_{\vec{x} \in R^2} f(\vec{x}) \cdot e^{2\pi i \vec{k}\vec{x}} d\vec{x} \quad (1)$$

$$\tilde{f}(\vec{X}) = \int_{\vec{x} \in R^2} f(\vec{x}) \cdot e^{-2\pi i \vec{k}\vec{x}} d\vec{x} \quad (2)$$

The target domain of the Fourier transformation is called k-space and the source domain is called the spatial domain. When f(x) is real, then the k-space becomes point-symmetrical relative to the zero point upon application of complex conjugation:

$$\int_{\vec{x} \in R^2} f(\vec{x}) \cdot \left(e^{2\pi i (-\vec{k}\vec{x})}\right)^* d\vec{x} = \int_{\vec{x} \in R^2} f(\vec{x}) \cdot e^{2\pi i \vec{k}\vec{x}} d\vec{x} \Leftrightarrow \tilde{f}(\vec{k}) = \tilde{f}(-\vec{k})^* \quad (3)$$

When x is shifted by an arbitrary vector, then the function f(x+a) can be calculated using the Fourier transform of f(x):

$$f(\vec{X} + \vec{a}) = \int_{\vec{k} \in R^2} \tilde{f}(\vec{k}) \cdot e^{-2\pi i \vec{k}(\vec{x}-\vec{a})} d\vec{k} \quad (4)$$

$$= \int_{\vec{k} \in R^2} \tilde{f}(\vec{k}) \cdot \underbrace{e^{-2\pi i \vec{k}\vec{a}}}_{\varphi(\vec{k})} \cdot e^{-2\pi i \vec{k}\vec{x}} d\vec{k}$$

A shift of the image in the spatial domain is thus expressed in an additional phase $\phi(\vec{k})$ of the Fourier transform. A rotation in the location space by an angle θ expressed by multiplication with a rotation matrix (Rθ), yields:

$$f(R(\theta) \cdot \vec{X}) = \int_{\vec{k} \in R^2} \tilde{f}(\vec{k}) \cdot e^{-2\pi i \vec{k} R(\theta) \vec{x}} d\vec{k} \quad (5)$$

$$= \int_{\vec{k} \in R^2} \tilde{f}(\vec{k}) \cdot e^{-2\pi i R^{-1}(\theta)\vec{k}\vec{x}} \cdot e^{-2\pi i \vec{k}\vec{x}} d\vec{k}$$

with $R(\theta) = \begin{pmatrix} \cos(\theta) & -\sin(\theta) \\ \sin(\theta) & \cos(\theta) \end{pmatrix}$ and with the substitution $\vec{k}' = R^{-1}(\theta)\vec{k} = R(-\theta)\vec{k}$:

$$\frac{dk'_x}{d\vec{k}} = \begin{pmatrix} \cos(-\theta) & \sin(-\theta) \\ -\sin(-\theta) & \cos(-\theta) \end{pmatrix} \quad (6)$$

$$\frac{dk'_y}{d\vec{k}} = \begin{pmatrix} \cos(-\theta) & -\sin(-\theta) \\ \sin(-\theta) & \cos(-\theta) \end{pmatrix}$$

$$\Rightarrow d\vec{k}' := dk'_x \cdot dk'_y =$$

$$\begin{pmatrix} \cos(-\theta) & \sin(-\theta) \\ -\sin(-\theta) & \cos(-\theta) \end{pmatrix} \cdot \begin{pmatrix} \cos(-\theta) & -\sin(-\theta) \\ \sin(-\theta) & \cos(-\theta) \end{pmatrix} \cdot d\vec{k}$$

$$\Rightarrow f(R(\theta) \cdot \vec{X}) = \int_{\vec{k} \in R^2} \tilde{f}(R(\theta)\vec{k}') \cdot e^{-2\pi i \vec{k}'\vec{x}} d\vec{k}'$$

A rotation of the location space by the angle θ effects the same rotation of the Fourier transform.

Overall, thus, for an arbitrary motion:

| Location Space | k-space |
|---|---|
| Translation | additional phase |
| rotation | rotation |

Given the shift of two functions f and g, R→R with f(x)–g(x+a), the following is valid with respect to its Fourier transform:

$$\tilde{f}(k) = \tilde{g}(k) \cdot e^{-2mka} \quad (7)$$

$$\tilde{f}(k) \cdot \tilde{g}(k)^* = |\tilde{g}(k)|^2 \cdot e^{-2mka} \quad (8)$$

$$\frac{\tilde{f}(k) \cdot \tilde{g}(k)^*}{|\tilde{g}(k)|^2} = e^{-2mka} \quad (9)$$

If the motion parameters of a rigid body in a plane that is arbitrarily shifted and rotated in two successive images is to be found, then this problem can be reduced to a number of one-dimensional observations (shifts per two functions R→R). The prerequisite for the method, however, is that the rigid body does not extend beyond the coverage area of the images. For example, the movement of a rigid body in the xy-plane of a three dimensional Cartesian coordinate system is unambiguously characterized by the three parameters of translation in the x-direction, translation in the y-direction and rotation around the z-axis.

Determination of the Rotation Angle:

According to equation (6), the rotation of an image in the spatial domain also causes the rotation of the Fourier transform. A translation, however, only acts on the phase of the Fourier transform. In order to decouple the rotation from the translation, the magnitude of the Fourier transform is thus considered. Each rotation here is a rotation around the origin. The sum over an annulus around the origin is invariant to the rotation. When an annulus is summed along its radii, then a one-dimensional function g(φ) is obtained. Two images rotated relative to one another thus supply two oppositely shifted functions $g_1(\phi)$ and $g_2(\phi)$. Since the image data in the location space are real, the k-space is symmetrical. Summation over respective halves of the annuluses thus suffices. According to equation (9), the shift can now be identified. When the shift of the two functions $g_1(\phi)$ and $g_2(\phi)$ is known, then the rotational angle has been found.

The rotational angle of a rigid body presented in two successive images is thus known and can be correspondingly corrected.

Subsequently, the translation parameters to be considered are determined, these being relative to the rotation and being independent of one another. As long as the prerequisite of the movement of a rigid body is met, i.e. as long as the subject does not leave the image area due to the translation, the translations along the x-axis and the y-axis can be separated from one another. This occurs by projections of the body onto the coordinate axes. These projections are respectively two lines shifted relative to one another. The determination of the translation parameters is thus reduced to the same sub-problem as the determination of the rotational angle, namely the problem of two functions R→R shifted relative to one another. The solution of this problem also ensues according to equation (9).

The above, known motion correction method is based on a rigid body that moves and/or is rotated from one image to another but does not change in shape. This prerequisite, however, is not satisfied when only a portion of an inherently rigid body lie in the coverage area of the image and other portions extend beyond the coverage area at an image edge. Because the rigid body is moved and/or rotated, parts of the body disappear from the coverage area of the images or new parts are added thereto. The presented body thus changes in shape, and a rigid body can longer be assumed in the observation of the images.

The prerequisites for the initially described method thus are not satisfied. This only occurs, however, in the edge zones of the images, and is not distributed over the entire k-space by the Fourier transformation. As described above, thus, the known method is not suitable under this circumstance and more complicated methods must be used.

SUMMARY OF THE INVENTION

An object of the present invention is to provide an efficient motion correction method that can also be used for a series of successive images wherein the body to be imaged does not lie completely in the coverage area of the images and is therefore cut off at the image edge.

The above object is achieved in a first embodiment of the inventive method, wherein a series of two-dimensional images of a rigid body is obtained, the images respectively having image edges defining a coverage area and wherein the rigid body does not lie completely in the coverage area and is cut off by one of the image edges, including the steps of selecting first and second chronologically successive images in the series, between which the motion correction is to implemented, and respectively mirroring the first and second images at the image edge which cuts off the rigid body, thereby producing two mirror images, attaching the first image and the mirror image of the second image and attaching the second image and the mirror image of the first image, at the image edge which cuts off the rigid body, thereby producing two new images that show a rigid body, to a good approximation, lying completely within these new images, determining motion parameters for time-successive images of the rigid body from the two new images according to a motion correction method, and correcting the first and second images using these motion parameters.

The above object is also achieved in a second embodiment of the inventive method, for motion correction in a series of two-dimensional images of a rigid body, the images respectively having image edges defining a coverage area and image edges including two image edges that do not lie opposite each other, and wherein the rigid body does not lie completely in the coverage area of the images and is cut off by the aforementioned two image edges that do not lie opposite each other, including the steps of selecting first and second time-successive images in the series, between which the motion correction is to be implemented, and respectively mirroring each of said two image edges and a point of intersection between these two image edges, thereby producing three mirror images for each of said first and second images, attaching the three mirror images acquired from the second image to the first image respectively at the two image edges, and attaching the three mirror images acquired from the first image to the second image respectively at the two image edges, thereby producing two new images that show a rigid body, to a good approximation, lying completely within these new images, determining motion parameters for time-successive images of a rigid body from the two new images according to a motion correction method, and correcting the first and second images using these motion parameters.

The newly arising images in step b) in each of the above embodiments of the inventive method, between which the further motion correction is to be implemented, exhibit a rigid body that completely lies in the coverage area of these images in a good approximation for small rotations and small translations.

According to the invention, a correction method thus is made available that functions in the manner of methods operating on the assumption of a rigid body that lies completely in the coverage area of the time-successive images. As discussed above, such methods are known and require significantly less calculating outlay compared to calculating methods for which the above premise does not apply, even if the necessary mirrorings and the images that are now two or four times as large require additional calculating outlay.

The series of successive images can be of tomograms as well as of projections of registered volumes.

Given the assumption that the rigid body can be projected into three orthogonal planes, whereby the projections either completely contain the image to be displayed or cut this off at an image edge, or at two image edges not lying opposite one another, the inventive method can also be expanded to three-dimensional bodies. The problem is thus resolved into three mutually independent sub-problems that are then solved by the motion correction methods according to the above embodiments.

The expansion of the motion correction to three dimensions initially increases the number of parameter to be identified from 3 to 6. A body can now be rotated around all three coordinates axes and shifted along all three axes. As in the two-dimensional case, the rotation parameters are first identified and the rotations are correspondingly corrected.

In order to decouple the rotations from the translations, the magnitude of the Fourier transform is again considered. In the two-dimensional case, the sum over an annulus whose center lies on the zero frequency in the k-space is invariant relative to rotations. In the three-dimensional case, this invariant is the sum over each hollow sphere whose midpoint lies on the zero frequency. In this case as well, the projection along the radii is possible, since each rotation after the Fourier transformation and amount formation occurs around the origin. This projection generates two discrete functions on two oppositely rotated spherical surfaces. Given rotation of the spherical surfaces relative to one another, three degrees of freedom are possible that, for example can be described by the three Euler angles known from classical mechanics.

The separation of the parameters from one another is problematical. This cannot be achieved by a simple projection as in the case of the translations. The parameters cannot be separated in this way. Given observation of three annuluses around the coordinate axes, thus, each annulus is also dependent on the rotations around the other axes. Mathematically, this problem is based on the fact that the two three-dimensional rotational matrices are generally not commutative. A transformation into a domain that produces commutativity would be necessary for a parameter separation.

The separation of the parameters, however, nonetheless can be achieved in many applications, however, it is necessary for this purpose to limit the allowable rotational angles. The advantage of the k-space techniques of also being able to recognize large rotations is lost in the three-dimensional case.

For small rotational angles, the rotations around the three axes are considered a good approximation, as being independent of one another. A volume data set is thus projected into the three orthogonal planes: xy-plane, yz-plane and xz-plane. The rotational angles are subsequently determined as described at the outset on the three two-dimensional data sets resulting therefrom. The error that is committed by this approximative solution lies in the 0.1% range given, for example, rotations by 2° and thus can be left out of consideration.

When the rotational angles have thus been found and the data sets have been correspondingly corrected, then the determination of the translation parameters follows, as in the two-dimensional case as well. The translation parameters, as in the two-dimensional case, are determined decoupled arid independently from one another by projections of the data sets onto the coordinate axes.

The motion correction for the three-dimensional thus also is been reduced to the shift of two respective functions R→R and can be solved with the initially described method.

The method of the invention can be especially advantageously utilized in 3-D image registration methods such as computed tomography or magnetic resonance tomography. The reduced calculating outlay is important particularly for the medical application of the method, wherein short image registration and processing times are especially desirable.

In such medical examinations, examinations of the head as well as of the brain represent preferred areas of application of the inventive method because the prerequisite for the method, that the body to be displayed is only cut off at one image edge, or at two image edges not lying opposite one another, can be unproblematically met. The neck region given presentations of the head, or the spinal marrow given presentations of the brain, thus usually leave the coverage area at an image edge.

According to experimental examinations for two time-successive images of a rigid body to be corrected relative one another, the limits of the inventive method lie at approximately 20% of the expanse of the body in the motion direction for the translational motion and at approximately 5° for the rotation. Given scans that exceed these limits, the image quality after the correction decreases noticeably. For the majority of medical applications, however, these limits do not represent a practical limitation of the inventive method.

DESCRIPTION OF THE PREFERRED EMBODIMENTS

In the functional examination of the human brain, a volume data set is repeatedly registered, for example with magnetic resonance tomography. In order to be able to observe the time series free of disturbances caused by movements, the volumes must be three-dimensionally corrected relative to one another. The disturbing influence of small movements of the head during the registration of a scene is thus suppressed.

Figure 1:
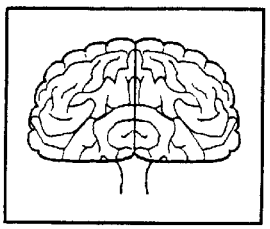
FIG. 1 shows the projection of a brain into the yz-plane.

FIG. 1 shows the projection of such a volume data set, acquired from the scanning of a human brain, in the yz-plane.

Figure 2:
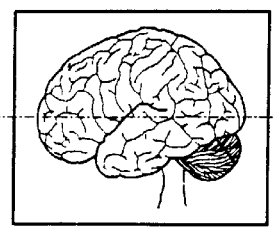
FIG. 2 shows the projection of a brain into the xz-plane.
Figure 3:
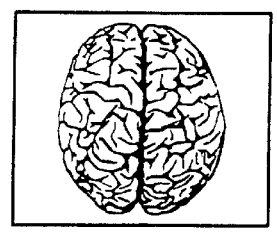
FIG. 3 shows the projection of a brain into the xy-plane.

FIGS. 2 and 3 show projections of the same volume data set into the xz-plane and the xy-plane, respectively.

As can be seen, the brain to be presented is cut off at the lower image edge of FIGS. 1 and 2 in the region of the spinal marrow. By contrast thereto, the projection according to FIG. 3 lies completely in the coverage area of the image. The initially described, conventional method thus can be implemented for this projection.

Not only for better illustration of the inventive method but also because this corresponds to a frequent application in diagnostic practice, only the upper part of a projection of the brain into the xz-plane, shown in FIG. 4, shall be presented below. Again, a part of the brain is cut off at the lower image edge.

Figure 4:
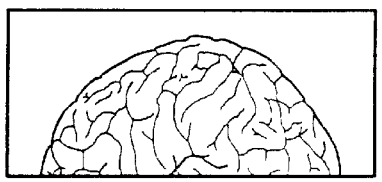
FIG. 4 shows an image excerpt of a brain in the xz-plane for explaining the inventive method.
Figure 5:
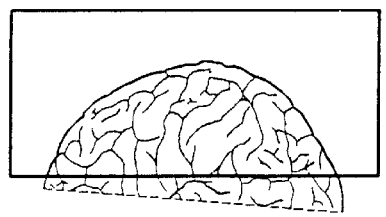
FIG. 5 shows an image excerpt of a brain shifted down and rotated compared to FIG. 4 for explaining the inventive method.

FIG. 5 shows a presentation offset in time compared to FIG. 4. The illustrated brain, compared to FIG. 4, is rotated in the clockwise direction and is shifted downwardly. The illustrated area thus no longer meets the prerequisite of a rigid body, and the conventional correction method explained earlier can no longer be applied. The rotation and translation shown in FIG. 5 compared to FIG. 4 serve the purpose of illustrating further procedures and does not correspond to reality in terms of magnitude.

Figure 6:
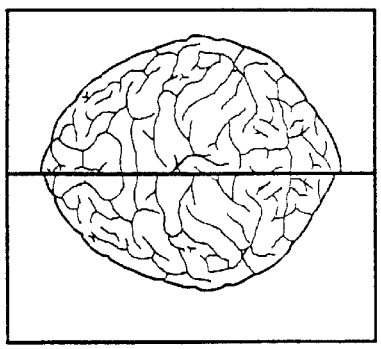
FIG. 6 shows an image composed of two chronologically successive images in accordance with the inventive method.
Figure 7:
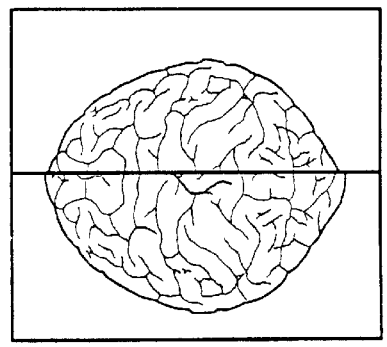
FIG. 7 shows an image composed of two-chronologically successive images in accordance with the inventive method.

The inventive method shown in FIGS. 6 and 7 alleviates this situation. First, the image shown in FIG. 5 is mirrored at the image edge at which the brain leaves the coverage area and is then attached to the image shown in FIG. 4. A body arises that, as shown in FIG. 6, lies completely within the area of coverage of the image, which is not twice as large.

Correspondingly, as shown in FIG. 7, the image shown in FIG. 4 is mirrored and attached to the image shown in FIG. 5. Again, an image that is twice as large arises, this completely containing the illustrated body.

The motion correction for rigid bodies that lie completely in the coverage area of the images can now be implemented between the images according to FIGS. 6 and 7.

This method is now also expanded onto the projection to the yz-plane and all volume data sets. The volumes can thus be corrected three-dimensionally relative to one another in a simple way with the method of the invention for motion correction given series of two-dimensional images of a rigid body, wherein the rigid body does not lie completely in the coverage area of the images and is cut off at an image edge. Time series of motion-corrected images can now be displayed.

Figure 8:
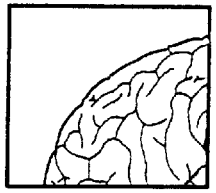
FIG. 8 shows an image excerpt of a brain in the xz-plane, wherein the brain is cut off at two image edges for explaining the inventive method.

FIG. 8 shows the projection of a human brain into the xz-plane, wherein the brain is cut off at two image edges that do not lie opposite one another.

Figure 9:
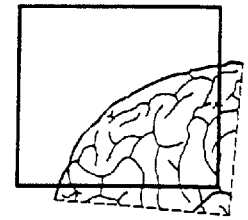
FIG. 9 shows an image excerpt of a brain shifted down and rotated compared to FIG. 8 for explaining the inventive method.
Figure 10:
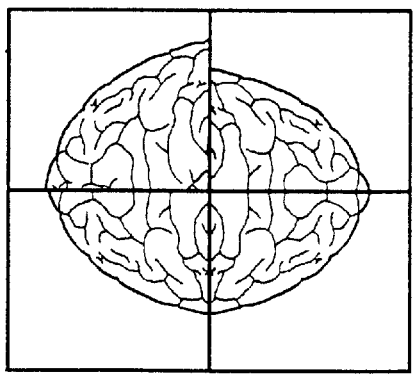
FIG. 10 shows an image composed of two chronologically successive images for explaining the inventive method.
Figure 11:
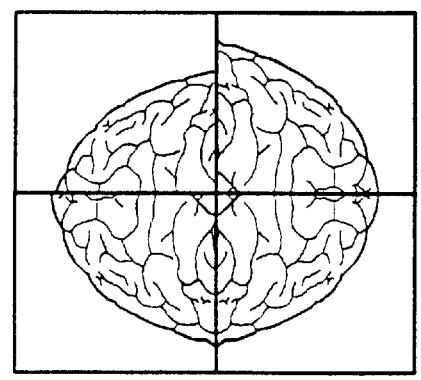
FIG. 11 shows an image composed of two chronologically successive images in accordance with the inventive method.

FIG. 9 shows a time-offset projection. As can be seen, the brain has rotated slightly in a clockwise direction compared to FIG. 8 and has shifted downwardly. By contrast to the exemplary embodiment of FIGS. 4 through 7, three mirror images of the respective other image are attached to each of the two images in this exemplary embodiment, as shown in FIGS. 10 and 11. The images with the corresponding mirror images of the respective other image are shown in FIGS. 10 and 11. The initially described, known motion correction method is now applied to these images, which are four times as large compared to the initial images, and that now completely contain an approximately rigid body, and thus the sought set of motion parameters is acquired. These motion parameters are then employed for correcting the initial images.

The exemplary embodiment shown in FIGS. 8 through 11 is now also expanded onto all projections and all volume data sets, so that the time series of the motion-corrected images can be ultimately displayed.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for motion correction in a series of two-dimensional images of a rigid body, said images respectively having image edges defining a coverage area wherein the rigid body does not lie completely in the coverage area of the images and is cut off at one of said image edges, comprising the steps of:

a) selecting first and second chronologically successive images in said series, between which the motion correction is to be implemented, and respectively mirroring said first and second images at said one of said image edges thereby producing two mirror images;

b) attaching the first image and the mirror image of the second image and attaching the second image and the mirror image of the first image at said one of said image edges thereby producing two new images that show a rigid body in a good approximation lying completely within said new images;

c) determining motion parameters for time-successive images of said rigid body from the two new images according to a motion correction method; and d) correcting said first image and said second image using said motion parameters.

2. A method according to claim 1 comprising acquiring the series of two-dimensional images from projections of volume data sets into three orthogonal planes, and respectively generating three two-dimensional images from the projections of each volume data set.

3. A method according to claim 2, comprising correcting said volume data sets using the motion parameters acquired from the series of two dimensional images.

4. A method according to claim 2, comprising acquiring the volume data sets from a 3 D imaging modality selected from the group consisting of computed tomography and magnetic resonance tomography.

5. A method according to claim 2 comprising, in generating said three two-dimensional images of a volume data set, generating one two-dimensional image which completely contains the rigid body and generating two two-dimensional images which cut off the rigid body to be presented.

6. A method according to claim 5, comprising conducting a motion correction according to a correction method for rigid bodies for the two-dimensional successive images that completely contain the rigid body, and subsequently, conducting a motion correction according to steps a0, b0, c0 and d0 for the two-dimensional time successive images that cut off the rigid body.

7. A method according to claim 1 comprising obtaining said series of two-dimensional images as a series of two-dimensional images of a brain as said rigid body.

8. A method according to claim 1 comprising acquiring said series of two-dimensional images wherein the movement of the rigid body is limited to a translational motion by a maximum of 20% of an expanse of the rigid body in motion direction and to a rotation of the rigid body by a maximum of 5°.

9. A method according to claim 1 comprising generating a reference image from a time average of a series of two-dimensional images and correcting all other images relative to said reference image.

10. A method for motion correction in a series of two-dimensional images of a rigid body, said images respectively having image edges defining a coverage area, said image edges including two image edges that do not lie opposite each other and wherein the rigid body does not lie completely in the coverage area of the images and is cut off by said two image edges comprising the steps of:

a) selecting first and second time-successive images in said series, between which the motion correction is to be implemented, and respectively mirroring said first and second images at each of said two image edges and at a point of intersection of said two image edges, thereby producing three mirror images for each of said first and second images;

b) attaching the three mirror images acquired from the second image to the first image respectively at said two image edges, and attaching the three mirror images acquired from the first image to the second image respectively at said two image edges, thereby producing two new images that show a rigid body in a good approximation, lying completely within said new images;

c) determining motion parameters for time-successive images of a rigid body from the two new images according to a motion correction method; and d) correcting said first image and said second image using said motion parameters.

11. A method according to claim 10 comprising acquiring the series of two-dimensional images from projections of volume data sets into three orthogonal planes, and respectively generating three two-dimensional images from the projections of each volume data set.

12. A method according to claim 10, comprising correcting said volume data sets using the motion parameters acquired from the series of two dimensional images.

13. A method according to claim 10, comprising acquiring the volume data sets from a 3 D imaging modality selected from the group consisting of computed tomography and magnetic resonance tomography.

14. A method according to claim 10 comprising obtaining said series of two-dimensional images as a series of two-dimensional images of a brain as said rigid body.

15. A method according to claim 10 comprising acquiring said series of two-dimensional images wherein the movement of the rigid body is limited to a translational motion by a maximum of 20% of an expanse of the rigid body in motion direction and to a rotation of the rigid body by a maximum of 5°.

16. A method according to claim 10 comprising generating a reference image from a time average of a series of two-dimensional images and correcting all other images relative to said reference image.

* * * * *